A. L. FIELD.
ATTACHMENT FOR WIND SHIELDS.
APPLICATION FILED JULY 18, 1917.
1,264,044.
Patented Apr. 23, 1918.
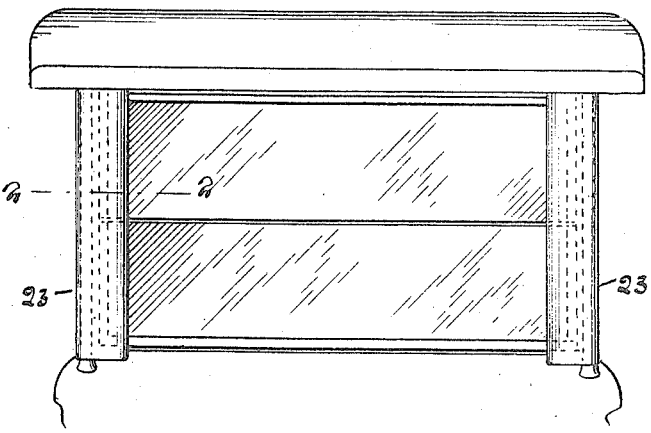
Fig. 1.
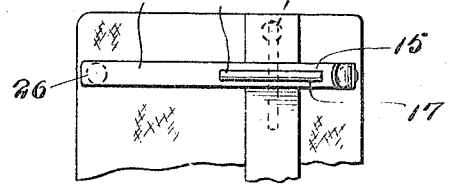
Fig. 3.
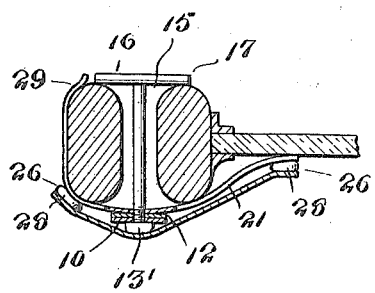
Fig. 2.
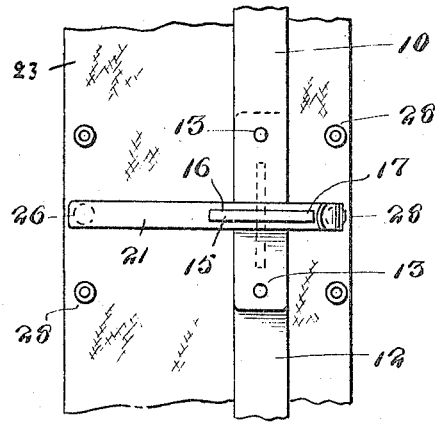
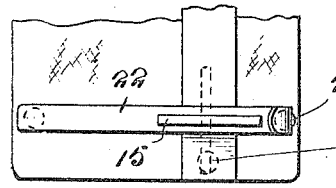
INVENTOR
A. L. Field
BY Victor J. Evans
ATTORNEY
WITNESSES

UNITED STATES PATENT OFFICE.

ASHBEL L. FIELD, OF FORT LAUDERDALE, FLORIDA.

ATTACHMENT FOR WIND-SHIELDS.

1,264,044.             Specification of Letters Patent.      Patented Apr. 23, 1918.

Application filed July 18, 1917. Serial No. 181,380.

*To all whom it may concern:*

Be it known that I, ASHBEL L. FIELD, a citizen of the United States, residing at Fort Lauderdale, in the county of Broward and State of Florida, have invented new and useful Improvements in Attachments for Wind-Shields, of which the following is a specification.

This invention relates to an attachment for the windshield of an automobile or the like, and the object is to provide means for closing the space between the shield and the standards supporting the latter in order to prevent the entrance of rain or snow.

A further object is to provide an adjustable and detachable device adapted for use in connection with different types of windshields and which may be quickly secured in position when needed and readily detached in the event that it is not desired to retain it permanently in position.

A further object is to provide an attachment of the character specified comprising a plurality of flexible members adjustable longitudinally with reference to each other, according to the size of the windshield in any given instance, and flexible means extending transversely of the members first mentioned and adapted for connection with the end portions of the shield and the standards supporting the latter, the structure described carrying a sheet of flexible material serving, in a measure, as a weather strip for closing the space between the shield and the standard.

With the foregoing and other objects in view, the invention consists in the novel construction, combination, and arrangement of elements hereinafter described and claimed.

Figure 1 is a view in elevation.

Fig. 2 is a horizontal section on the line 2—2 of Fig. 1.

Fig. 3 is a fragmentary view showing the protecting device in open position.

The attachment comprises a plurality of flexible strips designated 10 and 12 and constituting a main supporting rib, these strips being provided with a series of apertures 13 near their adjacent ends in order to permit of adjustment, and the strips being secured by means of attaching devices designated 15. These devices each comprise a shank portion and laterally extending members 16 and 17 designed to engage respectively the standards and the shield proper, when passed through the space above mentioned, from the outer portion thereof. The securing devices are threaded at the ends passing through the meeting strips and are provided with nuts 13' for retaining the devices in position.

Extending transversely of these strips 10 and 12 are braces 20, 21 and 22 any suitable number being employed, these braces being of resilient material and preferably bowed as indicated, and secured by members 15.

A sheet of flexible material 23 constituting the weather strip extends the full length of the members 10 and 12 and is secured to the ends thereof as indicated at 24 and 25 and is also secured to the transverse braces as shown at 26. Fastening devices 28 may be provided at suitable points as shown. The ends of braces 20, 21 and 22 are provided with standard engaging portions 29, aiding in holding the device in position.

What is claimed is:

1. In a device of the class described, a plurality of strips adjustable longitudinally with reference to each other and constituting a main supporting rib, fastening devices extending through the rib and including oppositely extending members engaging the windshield and the standards therefor, and a sheet of flexible material secured to the said strips.

2. In a device of the class described, a plurality of strips adjustable longitudinally with reference to each other and constituting a main supporting rib, braces extending transversely of the rib, fastening devices extending through the rib and through the braces, said devices including a shank portion and oppositely extending members adapted to engage a windshield and the standards therefor, and a sheet of flexible material secured to said braces and to the strips.

In testimony whereof I affix my signature.

ASHBEL L. FIELD.

Copies of this patent may be obtained for five cents each, by addressing the "Commissioner of Patents, Washington, D. C."